United States Patent
Isaak et al.

[11] Patent Number: 6,005,322
[45] Date of Patent: Dec. 21, 1999

[54] INTEGRATED FUEL CELL ELECTRIC MOTOR

[76] Inventors: Mark Frank Isaak, 242 First Ave., Cultus Lake, B.C., Canada, VZR 4Y9; Daniel Molleker, 19511 1st Ave. SE., Bothell, Wash. 98012

[21] Appl. No.: 09/056,687

[22] Filed: Apr. 8, 1998

[51] Int. Cl.[6] .......................... H02K 31/00; H02K 31/02; H02K 11/00
[52] U.S. Cl. ........................................ 310/178; 310/68 R
[58] Field of Search .................................... 310/300, 178, 310/68 R, 71, 261

[56] References Cited

U.S. PATENT DOCUMENTS 5,426,338  6/1995  Leupold .................................. 310/178

FOREIGN PATENT DOCUMENTS 2237896   2/1974  Germany.
57-193958 11/1982  Japan.
96/07560  3/1996  WIPO.

Primary Examiner—Clayton LaBalle
Attorney, Agent, or Firm—Oyen Wiggs Green & Mutala

[57] ABSTRACT

This invention relates to a novel design of electric motor wherein a fuel cell with an electrical output is integrated with a cylindrical type monopole (homopole) electric DC motor. Power is supplied to an output shaft by the introduction of reactants to the fuel cell. The fuel cell is positioned within and rotates with the rotor of the cylindrical type monopole (homopole) DC motor. This novel compact combination of a fuel cell and a cylindrical form of monopole (homopole) electrical DC motor enables the combination to fit within a confined space.

5 Claims, 1 Drawing Sheet

6,005,322

INTEGRATED FUEL CELL ELECTRIC MOTOR

FIELD OF THE INVENTION

The invention relates to a fuel cell integrated with a cylindrical form of monopole motor.

SUMMARY OF THE INVENTION

A fuel cell with an electrical output is integrated within a cylindrical form monopole electric motor. Power is supplied to an output shaft by the introduction of the fuel cell reactants to the invention. The fuel cell is allowed to rotate with the rotor of the cylindrical monopole motor. The combination of the fuel cell and motor allows the fuel cell/motor combination to fit within a smaller space than that accorded to two separate elements. Increases in efficiency are also seen from the forces on the fuel cell reactants due to the centrepedal action within the rotor. The effluent from the reaction is also cleared from the unit by this centrepedal action. Mating the direct current output of the electrical fuel cell to a monopole motor eliminates the requirement for electrical brushes. The use of a monopole motor also allows for the matching of the output characteristics of the electrical fuel cell to its load without the requirement for boosting voltage to increase electrical efficiency. The invention allows for the use of gas-gas Permeable Electron Membrane fuel cells as well as electrolye type fuel cells.

DESCRIPTION OF DRAWING

The drawing is an elevation section through the cylindrical body of the invention. The external aspect of the invention is a closed ends cylinder with a drive shaft exiting from the top.

DETAILED DESCRIPTION OF THE INVENTION

Figure 1:
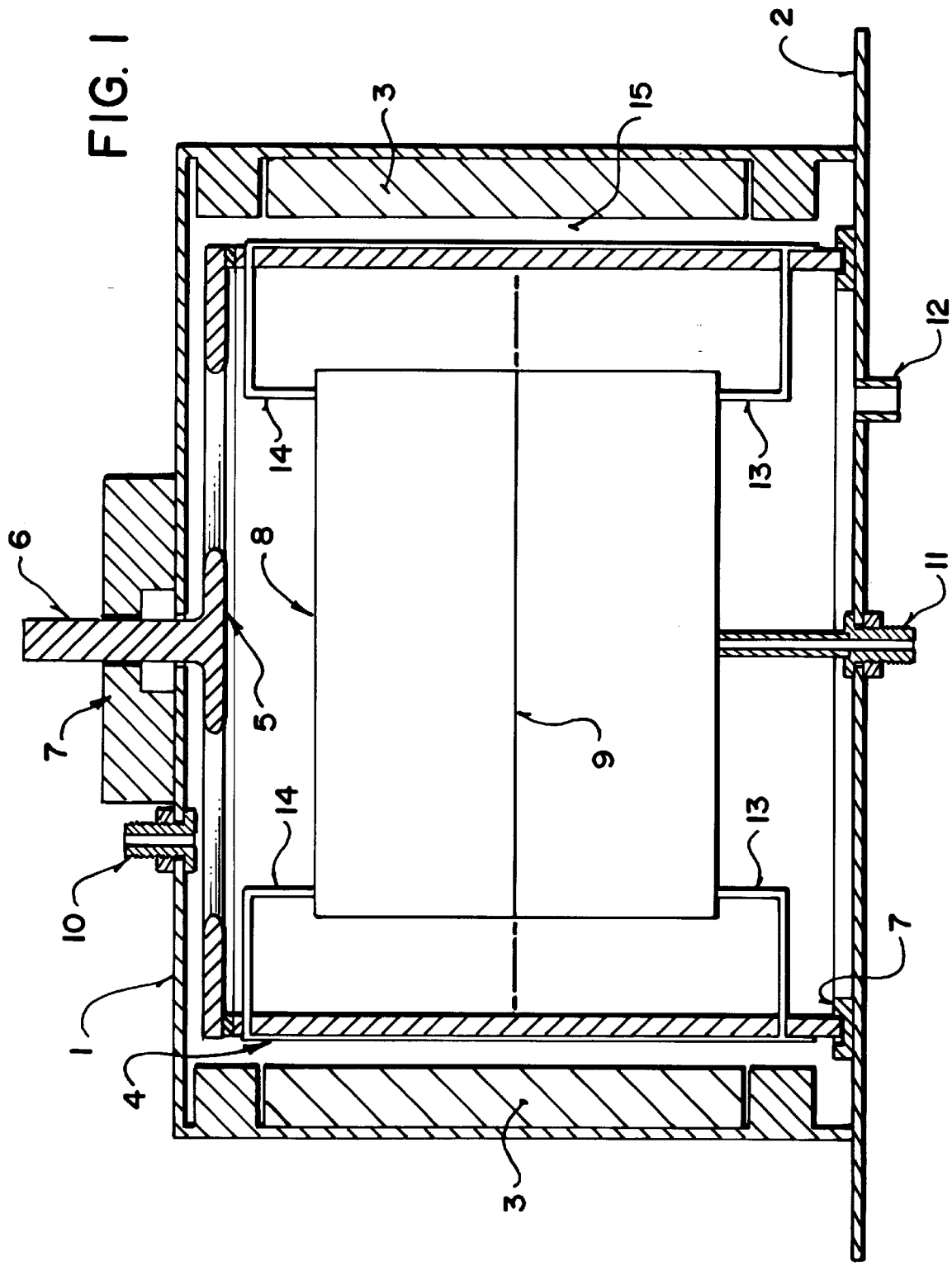

The invention is a monopole electric motor combined with an electrical fuel cell predominately intended for use as a prime mover in small automobiles.

An electrical fuel cell is placed within a cylindrical form monopole motor. The electrical output of the fuel cell is applied to the rotor of the monopole motor and the fuel cell is allowed to spin with the rotor. Mechanical power is taken off the output shaft of the monopole motor. This arrangement eliminates the requirement for electrical brushes.

The combination may be characterized as one steel cup with another. The closed ends are at the top. A shaft extends from the centre of the inner cup and pierces the outer cup. There is a bearing and seal between the shaft and the outer cup. This is the mechanical output shaft. The open end of the inner cup has a bearing and seal to a mounting plate. This mounting plate supports both the inner and outer cups. The outer cup is secured to the mounting plate. The inner cup is then free to rotate with respect to the outer cup. The inner cylindrical portion of the outer cup is lined with magnets. The outer cylindrical portion of the inner cup is plated with copper or another good conductor. The closed end of the inner cup is electrically insulated from the cylindrical portion of the inner cup.

An electrical fuel cell of gas—gas or gas-liquid type is placed within the inner cup. The reactants for the fuel cell are supplied to the chambers formed with the inner cup. The positive and negative electrical power leads from the fuel cell are applied to the top and bottom of the high conductivity outer portion of the inner cup. The electrical current acts at right angles to the magnetic field from the magnets of the outer cup and axial rotation of the inner cup results.

A wide variety of electrical fuel cells may be supported by this device with sealing regimes appropriate to the individual type of fuel cell. The centrepedal force caused by the rotational motion of the fuel cell attached to the inner cup is used to exhaust the effluent by-product of the fuel cell reactions and draw the reactants into the fuel cell.

As seen in the drawing, the main body (1) is an inverted cup whose cylindrical portion is constructed of steel or other ferromagnetic material. The main body is attached to the mounting plate (2) which also forms the bottom of the motor. The inside of the cylindrical portion of the main body 1 is coated with permanent magnets (3). The rotor (4) is placed within the main body 1 concentric with it. The rotor 4 may also be characterized as an inverted cup. The cylindrical portion of the rotor 4 is constructed of steel or other ferromagnetic material. The top portion of the rotor is a spider (5) that in turn supports the output shaft (6). The spider 5 is electrically insulated from the cylindrical portion of the rotor 4. The outside of the cylindrical portion of the rotor 4 is plated with copper or other high conductivity metal. The rotor 4 is supported by a bearing and seal (7) at the output shaft 6 and another bearing and seal at its bottom circumference. These bearings allow the rotor 4 to rotate with respect to the main body.

An electrical fuel cell (8) is then mounted within the rotor. The fuel cell 8 then rotates with the rotor. There is direct electrical connection with the high conductivity metal on the outside of the cylindrical portion of the rotor 4. This fuel cell 8 may be of the gas-gas Permeable Electron Membrane type or the gas-liquid electrolyte type. There is a demarcation (9) between the two reactants within the fuel cell 8 along with the bearing seals which forms two chambers in the fuel cell 8. The first fuel cell is fed from the top through an inlet (10) and the second fuel cell reactant from the bottom through another inlet (11). The effluent from the reaction leaves through an outlet (12) in the lower chamber. The rotational motion of the fuel cell 8 sets up a centrepedal force which is used to pump the reactants through the fuel cell 8 and clears the effluent.

The fuel cell reaction causes a direct electrical current to flow from the positive lead (13) to the negative lead (14). A magnetic field is created in the gap (15) between the magnets 3 of the main body 1 and the rotor 4. The magnetic circuit passes from the magnet 3 across the gap, through the conductor to the cylindrical portion of the rotor 4, back across the gap to the cylindrical portion of the main body 1 and back to the magnet 3. The action of the current from positive lead 13 to negative lead 14 at right angles to the magnetic field in the gap 15 produces a force perpendicular to both axes thereby causing the rotor 4 to rotate and in turn the output shaft 6.

What is claimed is:

1. An integrated fuel cell homopole electric motor comprising:
   (a) a cylindrical homopole motor constructed of:
      (i) a hollow cylindrical electroconducting body;
      (ii) a plurality of magnets dispersed around the interior of the hollow cylindrical electroconducting body; and
      (iii) a hollow cylindrical electroconducting rotor axially and rotationally mounted in the hollow of the cylindrical electroconducting body, said electroconducting rotor being electrically insulated from the hollow cylindrical electroconducting body; and (b) an electrical fuel cell mounted within the hollow of the cylindrical electroconducting rotor, the fuel cell being constructed of:
  (i) a first chamber holding a first fuel cell reactant;
  (ii) a second chamber separated from the first chamber, the second chamber holding a second fuel cell reactant;
  (iii) an inlet for the first fuel cell reactant;
  (iv) an inlet for the second fuel cell reactant;
  (v) an outlet for effluent from the fuel cell reaction;
  (vi) a positive electrical lead from the first chamber connected to the cylindrical electroconducting rotor;
  (vii) a negative electrical lead from the second chamber connected to the cylindrical electroconducting rotor.

2. A motor as claimed in claim 1 wherein the first and second reactants of the fuel cell are gases which react with each other and the first and second chambers are separated by a permeable membrane.

3. A motor as claimed in claim 1 wherein the fuel cell is an electrolyte-electrode type fuel cell.

4. A motor as claimed in claim 1 wherein the hollow cylindrical electroconducting body is an inverted cup, the hollow cylindrical electroconducting rotor is an inverted cup of a diameter smaller than the hollow cylindrical electroconducting body, and the cylindrical electroconducting rotor is associated with an electrically insulated spider, the spider being connected to a shaft which is positioned at the axis of the hollow cylindrical electroconducting body and enables the cylindrical electroconducting rotor to axially rotate within the interior of the hollow cylindrical electroconducting body.

5. A motor as claimed in claim 4 including an electroconductive material coated on the circumferential exterior of the hollow cylindrical electroconducting rotor.

* * * * *